H. B. CORNISH.
Bung and Vent.

No. 169,150.  Patented Oct. 26, 1875.

WITNESSES:
Chas. Nida
Alex F. Roberts

INVENTOR:
H. B. Cornish
BY Munn & Co
ATTORNEYS.

UNITED STATES PATENT OFFICE.

HARRY B. CORNISH, OF RIVER FALLS, WISCONSIN.

IMPROVEMENT IN BUNGS AND VENTS.

Specification forming part of Letters Patent No. 169,150, dated October 26, 1875; application filed August 14, 1875.

*To all whom it may concern:*

Figure 1:
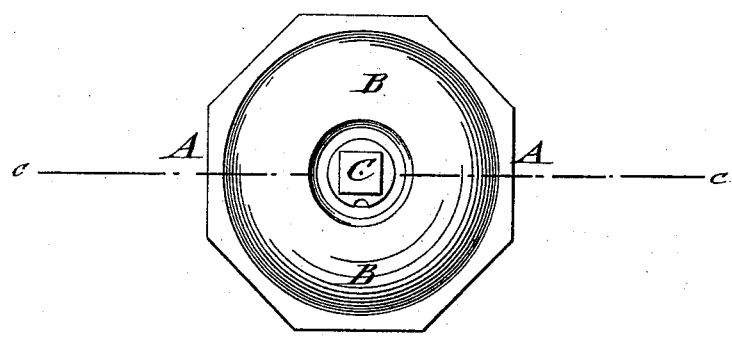
Figure 2:
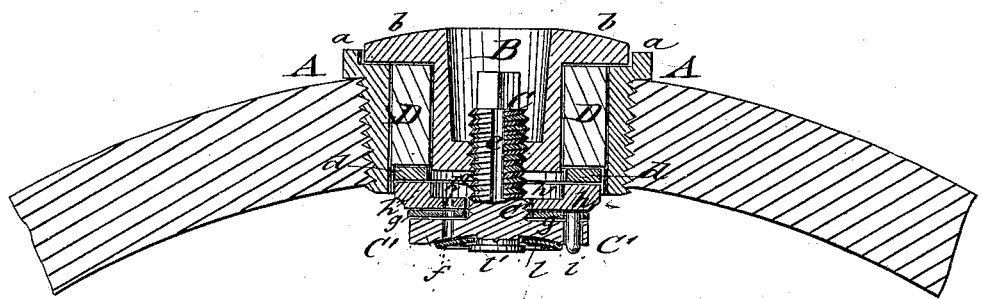
Figure 3:
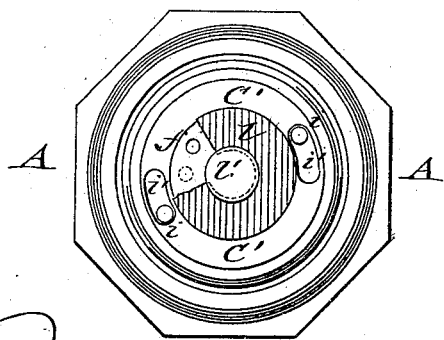

Be it known that I, HARRY B. CORNISH, of River Falls, in the county of Pierce and State of Wisconsin, have invented a new and Improved Bung and Vent, of which the following is a specification:

In the accompanying drawing, Figure 1 represents a top view, Fig. 2 a vertical central section on line $c\ c$, Fig. 1, and Fig. 3 a bottom view, of my improved bung and vent for beer and other barrels.

Similar letters of reference indicate corresponding parts.

My invention relates to an improved bung and vent that closes hermetically the bung-hole, while allowing the easy taking out of the bung and the ready admission of air through the vent arrangement without unseating the bung.

The invention consists of a flanged nut, with hollow countersunk part that screws on a screw-bolt of a bottom plate, for compressing an elastic sleeve placed around the nut, to fit tightly to the bushing. A vent-hole of the bottom plate supplies the air in connection with vent-holes of a rubber washer and recessed ring-plate between nut and adjustable bottom plate, and through a groove of the screw-bolt to the interior of the barrel, the opening and closing being defined by guide-pins of the ring-plate, and slots of the bottom plate.

In the drawing, A represents a threaded bushing that is firmly screwed into the bung-hole of the barrel. At the upper part of the bushing is seated in a recess and rim $a$ of the same the top flange $b$ of the nut B, which has a downward-extending cylindrical part, with interior cavity. The nut B turns on the screw-bolt C of the bottom plate or disk C′, the square end of the bolt being fitted for a key to adjust the bottom plate to the nut. The screw-bolt is countersunk in the cavity of the nut, and thereby fully protected against damage in handling and transporting the barrels. A ring-shaped sleeve, D, of rubber or similar elastic material, is placed on the cylindrical part of the nut, and compressed by the action of the bottom plate on turning the countersunk screw-bolt C. The compression of the rubber sleeve produces the hermetical closing of the bung in the bushing without chance of getting detached, as the bung has no parts projecting to any height above the surrounding barrel. A leather washer, $d$, is interposed between the sleeve and bottom plate, to prevent the wear of the rubber sleeve at the under side. The vent arrangement of the bung is produced by a groove, $e$, of the screw-bolt, and a vent-hole, $f$, of the bottom plate, the connection of groove and vent-hole being established by a perforated rubber washer, $g$, and metallic ring-plate $h$, interposed between the washer $d$ and bottom plate C′. An annular recess, $h^1$, of ring-plate $h$ around the screw-bolt admits the air from the groove to the perforation $h^2$, from which, when the vent is opened, the air passes through the vent-holes of the rubber washer and bottom plate into the barrel. The ring-plate $h$ is provided with opposite guide pins or studs $i$, which project through slots $i'$ of the bottom plate, so that, by turning the same in one direction, the vent-holes of bottom-plate washer and ring communicate and admit air, while, by a short turn of the screw-bolt in opposite direction, the bottom plate is carried back as far as the guide-pins will allow, interrupting thereby the connection of the vent-holes and closing the bung perfectly. The vent may thus be opened without interfering with the position of the bung, which remains in the barrel, until, for cleaning and filling the barrel, the bung is readily taken out by loosening the bottom plate and releasing the sleeve, so that it will allow the easy withdrawing of the bung. The bottom plate is furthermore provided with a rubber flap-valve, $l$, seated on a central annular projection or rim, $l'$, of the same, to secure the more complete working of the vent, and prevent the escape of the gas from the barrel by the automatical action of the flap-valve caused by the pressure of the gas thereon.

Having thus described my invention, I claim as new and desire to secure by Letters Patent—

The combination of grooved screw-bolt C, placed in the middle of bung, with recessed ring-plate $h$, having subjacent fins, the washer $g$ and the bottom plate C′, all having holes separated from or made to communicate with each other, by turning the bottom plate as set forth.

HARRY B. CORNISH.

Witnesses:
PAUL GOEPEL,
T. B. MOSHER.